Jan. 24, 1928. 1,657,098
J. J. N. VAN HAMERSVELD
CLUTCH OPERATING MECHANISM
Original Filed Aug. 11, 1924 2 Sheets-Sheet 1
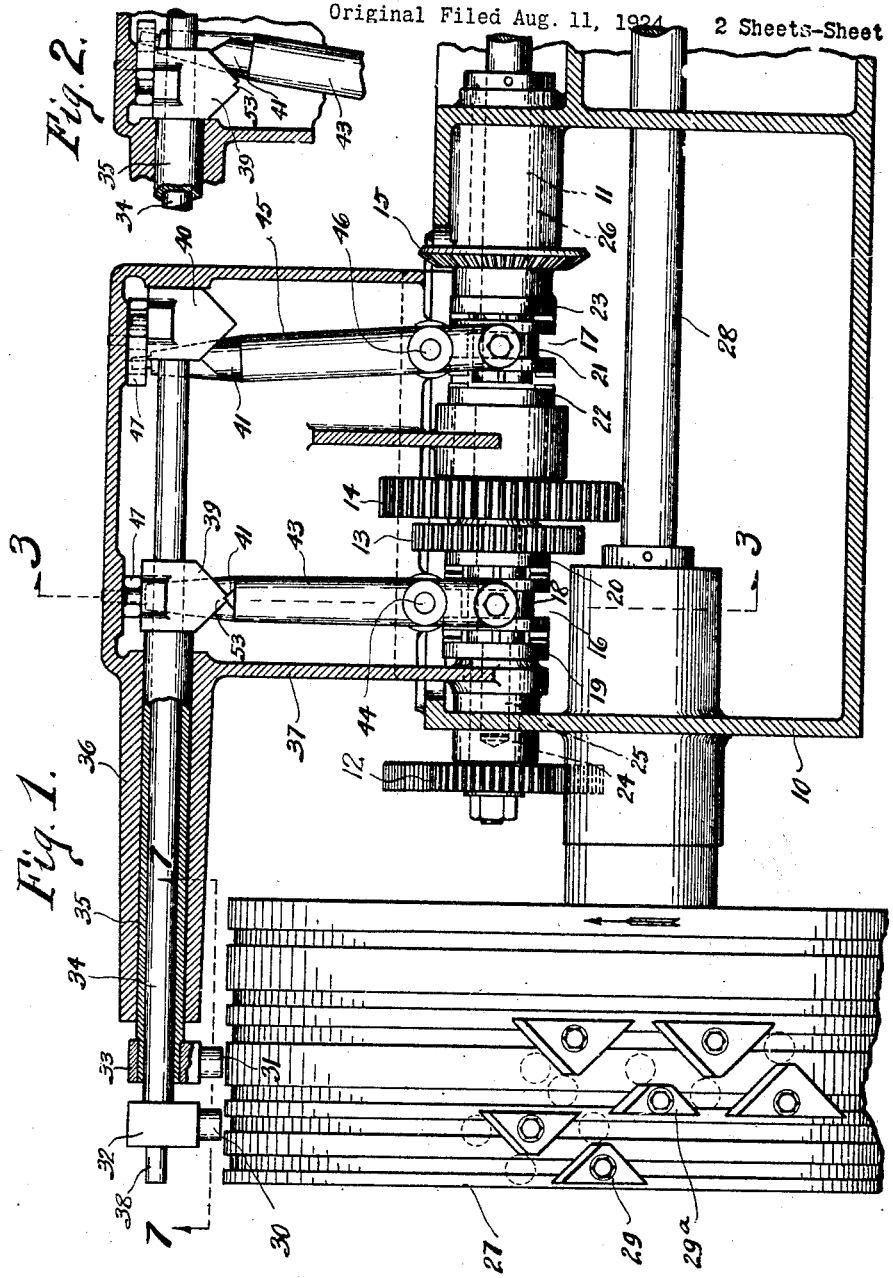

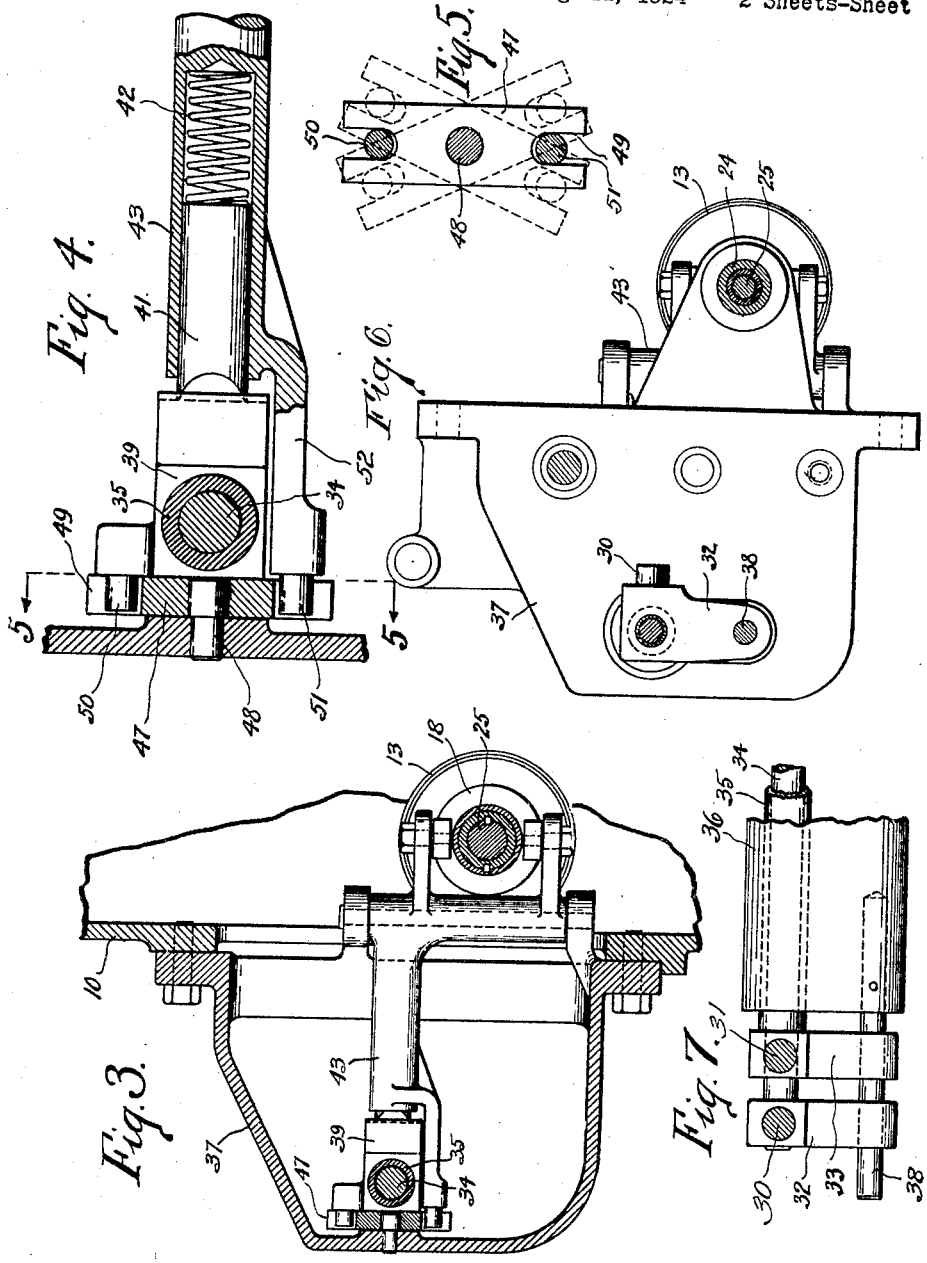

Patented Jan. 24, 1928.

1,657,098

UNITED STATES PATENT OFFICE.

JOHN J. N. VAN HAMERSVELD, OF CLEVELAND, OHIO, ASSIGNOR TO THE WARNER AND SWASEY COMPANY, OF CLEVELAND, OHIO, A CORPORATION OF OHIO.

CLUTCH-OPERATING MECHANISM.

Original application filed August 11, 1924, Serial No. 731,409. Divided and this application filed January 24, 1925. Serial No. 4,394.

This invention relates to clutch operating mechanism adapted particularly for use with clutches employed in automatic machines.

In certain automatic machines it is customary to employ clutches of the type embodying a movable clutch member which is disengaged and engaged through the action of a so-called spring point and spring point block one of which is carried by a lever connected to the movable clutch member and the other movable relative to it. Both the spring point and spring point block are wedge-shaped, and they are so arranged that in operating the clutch these two members have a wiping or camming action in a manner such that when the points of the two wedge-shaped members approach each other, energy is stored in a spring acting on the spring point, and when the points pass each other the energy thus built up in the spring is utilized to disengage the clutch and to cause the re-engagement of the clutch by moving the movable clutch member into engagement with a companion clutch member.

With this clutch operating mechanism, as heretofore constructed, the clutch is always disengaged by spring pressure, and as far as I am aware, it has not been possible to provide a neutral position without the use of outside mechanism acting on the clutch lever, nor has it been possible, as far as I am aware, to use the spring point feature in connection with single acting clutches.

One of the objects of the present invention is to provide means whereby the clutch may be positively disengaged, though operated through the medium of a spring point and spring point block, or equivalent means.

A further object is to provide means whereby clutch operating mechanism of this general type may be used advantageously with a single acting clutch, or for holding the movable clutch member in neutral position when utilized with a double acting clutch.

A still further object is to provide means whereby the movable clutch member is positively disengaged and engaged yieldingly or under the action of a spring with the movable clutch member yieldingly moved into engagement either with the same clutch member from which it was positively disengaged, or a second clutch member as when used in a double acting clutch.

The above and other objects are attained by my invention which may be here briefly summarized as consisting in certain novel combinations and arrangements of parts which will be described in the specification and set forth in the appended claims.

In the accompanying sheets of drawings I have shown my invention embodied in a metal working machine which is preferably of the type constituting the subject matter of a co-pending application, Serial No. 731,409, filed August 11, 1924, of which the present application is a division, although my invention is not confined in its field of use to a machine of this particular class.

In the drawings, Fig. 1 is a view partly in horizontal section and partly in plan of a portion of the metal working machine referred to, and illustrating two embodiments of my invention, both forms of the invention being preferably employed in conjunction with each other in the same machine; Fig. 2 is a detail view of a portion of a clutch operating lever, the spring point and spring point block of one of the clutches of Fig. 1 with parts in a slightly different position from that therein illustrated; Fig. 3 is a sectional view substantially along the line 3—3 of Fig. 1 looking in the direction indicated by the arrows; Fig. 4 is a detail view showing a portion of Fig. 3 on an enlarged scale, with part of the clutch operating lever in section; Fig. 5 is a sectional view substantially along the line 5—5 of Fig. 4, looking in the direction indicated by the arrows; Fig. 6 is a view looking toward the right of Fig. 1 with the tappet drum removed and showing particularly the spring point block operating members; and Fig. 7 is a detail sectional view substantially along the line 7—7 of Fig. 1 looking in the direction indicated by the arrows.

Referring now to the drawings, 10 represents a portion of the frame or bed which may be typical of any frame supporting the mechanism with which one or more clutches operated by my improved clutch operating mechanism may be employed. In this instance this mechanism includes a shaft 11 to be driven at a plurality of different speeds through gears 12, 13, 14 and 15, the means for driving which forms no part of the present invention. For the control of the gearing instrumental in driving shaft 11 through gears 12, 13 or 15, two clutches 16 and 17 are employed. Both clutches, as herein illustrated, are of the double acting type, clutch 16 having a movable clutch member 18 adapted to cooperate with two stationary clutch members 19 and 20, and clutch 17 being composed of a movable clutch member 21 adapted to cooperate with two stationary clutch members 22 and 23. It is to be understood that the word "stationary" is used in the sense that the clutch members are held from endwise movement, though, of course, they rotate. The two clutches are in this instance in line with each other, gear 12 and clutch member 19 being at opposite ends of a sleeve 24 in which one end of a shaft 25 has a bearing, this shaft being in alignment with the driven shaft 11. The movable clutch member 18 of clutch 16 is keyed to this shaft 25 and is adapted to have a limited axial movement thereon. Clutch member 20 of clutch 16 is formed on gear 13, which is loosely mounted on shaft 25. Clutch member 22 of clutch 17 is fixed to the end of shaft 25, or is formed as an integral part thereof. Movable clutch member 21 of clutch 17 is keyed to the driven shaft 11, and is slidable axially thereon between clutch members 22 and 23. Clutch member 23 of clutch 17 is formed integral with gear 15, the gear 15 forming a part of a sleeve 26 in which shaft 11 has a bearing. Thus it will be seen that when clutch member 18, which in Fig. 1 is shown in neutral position, is moved into engagement with clutch member 19, gear 12 is clutched to shaft 25, and when it is moved to the right into engagement with clutch member 20, gear 13 is clutched to shaft 25. Likewise, it will be seen that when the movable clutch member 21 of clutch 17 is in engagement with the clutch member 23, as shown in Fig. 1, gear 15 is clutched to shaft 11, which is then disconnected from shaft 25. On the other hand, when the clutch member 21 is moved to the left into engagement with clutch member 22, driven shaft 11 is clutched to shaft 25 which will then be driven either through gear 12, gear 13 or gear 14. As explained above, the clutching of gears 12 and 13 to shaft 25 is controlled through clutch 16. When this clutch is in neutral position, shaft 25 may be driven by gear 14, preferably independently of clutch 16, through what is commonly termed an automatic pick-up clutch. That is to say, when clutch member 21 of clutch 17 is thrown to its left hand position, as viewed in Fig. 1, it will be driven by shaft 25 through gear 12, or gear 13 or gear 14, depending upon whether the movable clutch member 18 of clutch 16 is in its left hand position, right hand position, or in neutral position. It might be here stated that in the application of my invention to a metal working machine such as constitutes the subject matter of my co-pending application referred to, gears 12, 13 and 14 constitute what are termed feed gears and form parts of three gear trains for imparting feeding movements to tool carrying slides. The gear 15 constitutes one element of a constant high speed driving mechanism for the slides, this mechanism being generally utilized when the tools are approaching or receding from the work-piece.

For the automatic operation of the clutches 16 and 17 there is employed a tappet drum 27 which is rotated by a shaft 28 supported in the frame or body 10. The drum 27 is provided with tappets and cam members for automatically controlling the functions of the machine, and these include two series of tappets 29 which are adapted to engage rollers 30 and 31, these rollers being secured to roller blocks 32 and 33 which are secured to two endwise movable members utilized in the control of clutches 16 and 17, which members are in the form of a rod 34, and a sleeve 35 arranged coaxially, the sleeve having a bearing in a boss 36 of a gear box 37 which is bolted to the frame or bed 10, and the rod 34 having a bearing in sleeve 35. The two roller blocks 32 and 33 are prevented from a swinging or rotating movement by a guide rod 38 which projects out from the end of boss 36, and with which the blocks have sliding engagement, as shown in Fig. 7.

The sleeve 35 has secured to it a spring point block 39, and rod 34 has secured to it a spring point block 40. Spring point block 39 is adapted to cooperate with a spring point 41 pressed outward by a spring 42, the spring point and spring being supported in a socket of a clutch operating lever 43 (see Figs. 1 and 4), pivotally supported at 44 on the gear box 37, and adapted when rocked to shift clutch member 18 of clutch 16.

Spring point block 40 cooperates with a similar spring point 41 which is acted on by a similar spring 42 and also mounted in a socket of a clutch operating lever 45 pivoted at 46 on the gear box and adapted to shift clutch member 21 of clutch 17.

As the spring point and spring point block have heretofore been used for operating clutches, particularly in metal working machines or other machine tools, the spring point block has been moved relative to the spring point so as to first push in the spring point and compress the spring acting thereon, and when the point of the block passed the point of the spring point, the spring point would slide down the opposite face of the block and the energy built up in the spring caused the movable clutch member to be disengaged from one stationary clutch member and thrown into engagement with the opposite stationary clutch member. That is to say, the disengagement and engagement were both caused by spring pressure. The yielding disengagement or disengagement by spring pressure of the clutch in certain machine tools has the disadvantage that under certain conditions, where the feed is to be changed during the cutting action of the tools on the work-piece, such a torsional pressure is created between the teeth of the clutch members to be disengaged, that disengagement is impossible, and only by giving the clutch teeth a decided taper, may it be possible to overcome the torsional pressure or frictional contact between the teeth of the clutch members to cause the disengagement of the clutch.

In accordance with an important feature of the present invention, the disengagement is produced positively independently of the action of the spring, and this is accomplished in the following manner: A positive actuating device is associated with each spring point block and arranged so as to positively shift the clutch lever during that half of the movement of the spring point block which depresses the spring point 41 and stores energy in the spring, during which movement, in the prior constructions, the clutch lever remains stationary. This positive actuating means is preferably in the form of a swivel plate 47, one of which is provided in association or in connection with each spring point block, and each being swiveled to or pivotally mounted on a suitable stationary support, in this instance, the gear box 37, by means of a bearing pin 48, each of these swivel plates 47 being supported on one of the stationary bearing pins behind the spring point block. Each of these swivel plates as preferably constructed, is substantially H-shaped, being swiveled at the center, and provided at opposite ends with slots 49. Engaging in the two slots of the swivel plate 47, are two pins 50 and 51, one carried by the spring point block and the other carried by an extension 52 of the associated clutch lever 43 or 45. These pins 50 and 51 may be formed integral with the spring point block and lever, or they may be separate members attached thereto. Obviously, therefore, each swivel plate mechanically connects the spring point block to the associated clutch lever so that the movement imparted to the spring point block is transmitted in a positive manner to the lever during the movement of the spring point block which compresses the spring 42 acting on the spring point, there being a direct mechanical connection from a tappet on the tappet drum to the roller 30 or 31, to the roller block 32 or 33, to the rod 34 or sleeve 35, to the spring point block, and through the swivel plate to the clutch operating lever. During this movement the clutch is disengaged in a positive manner, and when the point of the spring point block is moved past the point of the spring point, the spring which was compressed during the former movement is free to cause the engagement of the clutch with the companion stationary clutch member, assuming that the invention is used with a double acting clutch, and assuming that the clutch does not have a neutral position. The action just described takes place with the clutch member 17, which as previously stated, does not require a neutral position. Furthermore, the mechanism associated with clutch 16 has the same operation except that in accordance with another feature of my invention, provision is made for holding the movable clutch member in neutral position by the action of the spring point and spring point block, a feature not heretofore possible in clutch operating mechanisms of this type. This is accomplished in connection with the clutch operating mechanism of clutch 18 (which desirably has a neutral position for the reasons already stated) by providing at the apex of the wedge-shaped spring point block 39 a notch 53 into which the point of spring point 41 snaps as soon as the movable clutch member 18 is disengaged. The pressure of the spring 42 acting on the spring point now serves to hold the clutch in neutral position, assuming, of course, that the spring point block 39 is permitted by the tappets 29 to remain in a position corresponding to the neutral position of clutch 18. When, however, it is desired in a cycle of the machine that the clutch member be moved from neutral position, a tappet on the drum 27 will come into action and shift the spring point block so as to positively move (through the swivel plate) the point of the spring point out of the notch 53 so as to permit the spring 42 to cause the re-engagement of the clutch. In Fig. 1 I have shown a tappet, here designated 29<sup>a</sup>, which is shorter than the other tappets of the same series so as to permit the spring point to engage in the notch 53 of the spring point block 39. It will be seen by the dotted circles representing the different positions of the roller 31 relative to the tappets as illustrated in said figure, that as the drum is rotated in the direction indicated by the arrow in Fig. 1, the tappet in advance of the relatively short tappet 29<sup>a</sup> will cause the movable clutch member 18 of clutch 16 to be moved into engagement with the stationary clutch member 19, the spring point and spring point block then being in the relative positions indicated in Fig. 2. Also it will be seen that when the relatively short tappet 29<sup>a</sup> engages roller 31, movable clutch member 18 will be disengaged from clutch member 19 and moved to neutral position, the relative positions of the parts then being as shown in Fig. 1. Also it will be seen that when the tappet rearwardly of the relatively short tappet 29ª engages the roller 31, the clutch member 18 is moved from neutral position again into engagement with the clutch member 19. It will be understood, of course, that by the proper disposition of tappets the movable clutch member 18 can as readily be moved from neutral position into engagement with the opposite clutch member 20 or from one extreme position to another without stopping in neutral position if such action is desired, this being indicated by the two lowermost dotted line positions of the roller 31.

In Fig. 5 I have shown by full lines the position of the swivel plate which is associated with the spring point block 39 when the clutch 16 is in neutral position, i. e. when the spring point engages in the notch 53 and in this same figure I have shown by dotted lines the positions of the swivel plate when the movable clutch member 18 is in its two extreme positions, i. e. when in engagement with the clutch member 19 and with the clutch member 20.

It will be seen, therefore, that in thus moving the spring point out of the notch 53, the spring point block may be moved in either direction so as to cause the movable clutch member to return into engagement with the same stationary clutch member from which it was previously disengaged, or into engagement with the companion or opposite stationary clutch member, this being a feature not possible with prior clutches operated on the spring point and spring point block principle.

It will be equally obvious that in some constructions wherein a neutral position is desired, a double acting clutch may not be necessary, in which event the movable clutch member will be positively moved out of engagement with the stationary clutch member to neutral position, and then will be moved by the action of the spring back into engagement with the same clutch member when the spring point block is returned to its former position by movement in the opposite direction to that which it was previously given when the clutch was being disengaged.

It will be understood that by the addition of the swivel plate 47 in connection with the spring point and spring point block clutch operating means, the clutch lever is positively shifted to disengage the clutch through the action of the swivel plate which mechanically connects the clutch lever with the spring point block, but when the points of the spring point and spring point block pass each other, the spring associated with the spring point causes yieldable engagement of the clutch, provision being made through the medium of the notch 53 for holding the clutch in neutral position and for allowing the movable clutch member to yieldingly engage either stationary or non-slidable clutch member.

While I have shown only one embodiment of the clutch operating mechanism in so far as the instrumentalities are concerned which shift and control the clutch lever, equivalent means or devices might be employed, and I do not desire to be confined to the precise constructions or arrangements illustrated, but aim in my claims to cover all modifications which do not involve a departure from the spirit and scope of my invention as defined in the appended claims.

Furthermore, I do not intend to limit my invention to any particular type of machine notwithstanding the fact that one particular type has been referred to in the specification.

Having described my invention, I claim:

1. In combination with a clutch, a spring point and a co-operating spring point block, and a clutch lever carrying one of said parts and connected to the other.

2. In combination with a clutch, a clutch lever, a spring point and a spring point block, one movable with the lever and the other movable to actuate the lever, the lever being connected to the last mentioned part.

3. In combination with a clutch, a clutch lever, a spring point and a spring point block, one movable with the lever and the other movable to actuate the lever and connected to the latter, said spring point and spring point block having provision for holding the clutch in neutral position.

4. In combination with a clutch having a movable clutch member and a lever for shifting the same, a spring point carried by the lever, a spring point block, cooperating with the spring point to cause yielding engagement with the clutch, and means acting on the lever to cause positive disengagement of the clutch.

5. In combination with a clutch of the double acting type, having a movable clutch member and oppositely disposed non-slidable clutch members, means for causing positive disengagement of said movable clutch member from one of said non-slidable clutch members and yieldable engagement with either of the non-slidable clutch members, means being provided for holding the clutch in neutral position.

6. In combination with a clutch of the double acting type having a movable clutch member and oppositely disposed non-slidable clutch members, means for causing the movable clutch member to be moved out of engagement with either non-slidable clutch member and into engagement with either non-slidable clutch member, the disengagement being positive and the re-engagement being yieldable, means being provided for holding the clutch in neutral position.

7. The combination with a clutch having a movable clutch member, of a clutch operating mechanism comprising an operating member, a spring point and a spring point block, one of said two last mentioned parts being connected to one of said members and the other being connected to the other of said members, a part of said operating mechanism having means embodied therein for holding the clutch in neutral position.

8. In combination with a clutch having a movable clutch member, an operating mechanism therefor comprising a spring point and a spring point block, one of said parts having a notch adapted to receive the point of the other part to hold the clutch disengaged and one of said parts being connected to the movable clutch member, and an operating member connected to the other of said parts so as to shift the same.

9. In combination with a clutch, a clutch lever, a spring point and spring point block, means for shifting one of the last mentioned parts, one of said parts being carried by the lever and means forming a positive connection between said part which is shifted and the lever.

10. In combination with a clutch, an operating mechanism therefor comprising a clutch lever, a spring point and spring point block, means for shifting one of the last mentioned parts, and a swivel plate forming a positive connection between said part and the lever.

11. In combination with a clutch having a movable clutch member, a clutch operating mechanism including a spring point and spring point block, an operating member connected to one of said parts so as to shift the same, a member carrying the other of said parts and connected to the movable clutch member, and means forming a positive connection between the operating member and said second-named member whereby the clutch is positively disengaged.

12. In combination with a clutch having a movable clutch member, a clutch operating mechanism including a spring point and spring point block, an operating member connected to one of said parts so as to shift the same, a member carrying the other of said parts and connected to the movable clutch member, and means forming a positive connection between the operating member and said second-named member whereby the clutch is positively disengaged, means being provided in said operating mechanism whereby the clutch may be held in neutral position.

In testimony whereof, I hereunto affix my signature.

JOHN J. N. VAN HAMERSVELD.